(12) United States Patent
Pauskar et al.

(10) Patent No.: US 9,810,264 B2
(45) Date of Patent: Nov. 7, 2017

(54) METHOD OF FORMING A BEARING COMPONENT

(71) Applicant: The Timken Company, North Canton, OH (US)

(72) Inventors: Praveen Pauskar, Massillon, OH (US); Richard J. Abbruzzi, Canton, OH (US); Wayne V. Denny, Alliance, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 15/377,870

(22) Filed: Dec. 13, 2016

(65) Prior Publication Data

US 2017/0089393 A1    Mar. 30, 2017

Related U.S. Application Data

(63) Continuation of application No. PCT/US2016/028079, filed on Apr. 18, 2016.
(Continued)

(51) Int. Cl.
*F16C 33/64* (2006.01)
*B22F 3/16* (2006.01)
(Continued)

(52) U.S. Cl.
CPC .............. *F16C 33/64* (2013.01); *B22F 3/16* (2013.01); *B22F 3/164* (2013.01); *B22F 3/24* (2013.01); *B22F 5/00* (2013.01); *B23P 9/02* (2013.01); *B23P 15/003* (2013.01); *B24B 39/00* (2013.01); *C21D 1/18* (2013.01); *C21D 7/08* (2013.01); *C21D 7/13* (2013.01); *C21D 9/36* (2013.01); *C21D 9/38* (2013.01); *C21D 9/40* (2013.01); *F16C 33/585* (2013.01);
(Continued)

(58) Field of Classification Search
CPC ...... B22F 3/24; B22F 3/18; B22F 3/16; F16C 33/64
USPC ..................................................... 29/898.066
See application file for complete search history.

(56) References Cited

U.S. PATENT DOCUMENTS 3,782,794 A    1/1974    Chmura et al.
3,874,049 A    4/1975    Ferguson
(Continued)

FOREIGN PATENT DOCUMENTS

EP    1398111    3/2004
WO    03020460   3/2003
(Continued)

OTHER PUBLICATIONS

International Search Report and Written Opinion for Application No. PCT/US2015/028079 dated Sep. 8, 2016 (12 pages).
(Continued)

*Primary Examiner* — Weiping Zhu
(74) *Attorney, Agent, or Firm* — Michael Best & Friedrich LLP

(57) ABSTRACT

A method of forming a component includes heating the component to a burnishing temperature above 500 degrees Fahrenheit, and burnishing a surface of the component while the component is at the burnishing temperature to densify the surface. The burnishing process at an elevated temperature may be integrated into other processes, such as the sintering or heat treating processes.

18 Claims, 11 Drawing Sheets

Related U.S. Application Data

(60) Provisional application No. 62/151,705, filed on Apr. 23, 2015.

(51) Int. Cl.

| | | |
|---|---|---|
| *B22F 3/24* | (2006.01) | |
| *B23P 9/02* | (2006.01) | |
| *B23P 15/00* | (2006.01) | |
| *C21D 7/13* | (2006.01) | |
| *F16C 33/58* | (2006.01) | |
| *C21D 7/08* | (2006.01) | |
| *C21D 9/36* | (2006.01) | |
| *C21D 9/38* | (2006.01) | |
| *C21D 9/40* | (2006.01) | |
| *B22F 5/00* | (2006.01) | |
| *B24B 39/00* | (2006.01) | |
| *C21D 1/18* | (2006.01) | |

(52) U.S. Cl.
CPC ... *B22F 2003/166* (2013.01); *B22F 2003/247* (2013.01); *B22F 2003/248* (2013.01); *B22F 2999/00* (2013.01); *F16C 2220/20* (2013.01); *F16C 2223/02* (2013.01); *F16C 2223/10* (2013.01)

(56) References Cited

U.S. PATENT DOCUMENTS

| | | |
|---|---|---|
| 4,393,563 A | 7/1983 | Smith |
| 4,627,958 A | 12/1986 | Hays |
| 5,174,143 A | 12/1992 | Martin |
| 5,540,883 A | 7/1996 | Jones et al. |
| 5,824,168 A | 10/1998 | Miyamoto et al. |
| 6,013,225 A | 1/2000 | Cadle et al. |
| 6,044,555 A | 4/2000 | Jacob et al. |
| 6,171,546 B1 | 1/2001 | Mårs et al. |
| 6,264,768 B1 | 7/2001 | Sonti et al. |
| 6,592,809 B1 | 7/2003 | Anderson et al. |
| 7,160,351 B2 | 1/2007 | Trasorras et al. |
| 7,169,351 B2 | 1/2007 | Bengtsson et al. |
| 7,188,398 B2 | 3/2007 | Prevey |
| 7,287,907 B2 | 10/2007 | Cadle et al. |
| 7,641,850 B2 | 1/2010 | Sontti et al. |
| 7,685,717 B2 | 3/2010 | Shibata et al. |
| 2004/0197219 A1* | 10/2004 | Degen ............. B22F 3/03 419/28 |
| 2005/0155203 A1* | 7/2005 | Prevey ............. B23P 9/02 29/90.01 |
| 2006/0182648 A1 | 8/2006 | Xu et al. |
| 2007/0048169 A1 | 3/2007 | Sun et al. |
| 2009/0129964 A1 | 5/2009 | David et al. |

FOREIGN PATENT DOCUMENTS

| | | |
|---|---|---|
| WO | 2006072162 | 7/2006 |
| WO | 2014019670 | 2/2014 |

OTHER PUBLICATIONS

Radziejewska et al., "Microstructure and residual stresses in surface layer of simultaneously laser alloyed and burnished steel," Journal of Materials Processing Technology, Feb. 19, 2009;209(4):2047-56.
Tian et al., "Laser-assisted burnishing of metals," International Journal of Machine Tools and Manufacture, Jan. 31, 2007;47(1)14-22.

* cited by examiner

| Million Revolutions before failure of Standard Bearing Cup | Million Revolutions before failure of improved powder metal bearing cup |
|---|---|
| 252.8 | 2.2 |
| 135 | 429.2 |
| 79.5 | 756 |
| 56.1 | 1006 |
| 118.5 | ----- |
| 169 | ----- |
| 175 | ----- |
| 247 | ----- |

METHOD OF FORMING A BEARING COMPONENT

RELATED APPLICATIONS

This application is a continuation of PCT Application No. PCT/US2016/028079, filed on Apr. 18, 2016, which claims the benefit of U.S. Provisional Patent Application No. 62/151,705 filed Apr. 23, 2015, the entire content of both applications being hereby incorporated by reference.

BACKGROUND

The present invention relates to bearings, and more specifically, to surface strengthening techniques for bearing components.

Inclusions and porosity in metals are detrimental to the performance of highly stressed mechanical components, such as bearing components (e.g., bearing raceways). In the case of powder metallurgy, powder metal ("PM") components inherently include porosity that results in reduced strength, making them unsuitable for various highly stressed applications. The strength of PM materials increases with a reduction in porosity. Techniques such as double-press, double-sinter, powder forging, and others have been used to reduce porosity and improve the strength of PM components. Additionally, selective densification at and near the surface of components improves the rolling and sliding contact fatigue behavior of compacted and sintered materials.

Forming mechanical components using a powder metallurgy process has many advantages, such as being able to produce parts with complex geometry near final net shape with very little or no machining operations. The typical powder metallurgy manufacturing process typically includes compacting a selected powder mix under high pressure into a shape known as a pre-form. The pre-form is then thermally treated by a process known as sintering, which causes the powder particles to fuse together. The strength of the PM part is directly related to its density. Density of pressed and sintered products depends upon the pressure at which they are compacted. Because compaction pressure is limited by the strength of the compaction tooling, sometimes multiple pressing operations (e.g., double-press) are conducted on the sintered part to increase its density. To achieve 100% density, the sintered PM part is further hot forged. To perform all these operations significantly increases the cost of manufacturing, which makes PM unattractive in the case of bearing components.

As briefly mentioned above, the surface of less than 100% densified components may be selectively strengthened via densification by the application of mechanical pressure. This can be achieved by, for example, rolling a hard roller over the surface (i.e., burnishing) and/or localized hammering (i.e., peening). Burnishing and peening help extend the operational life of the components under cyclic fatigue conditions. Previously, these processes were usually only able to accomplish densification to a depth of less than 0.5 mm, with some processes able to densify only up to 1 mm below the surface. Also, some of the pores may not be effectively closed with typical burnishing and peening techniques, which results in lower performance under rolling contact fatigue conditions.

SUMMARY

Thus, an improved method for strengthening PM and non-PM bearing components via surface densification to depths greater than 1.0 mm is greatly desired. The present invention provides such a method. The inventive process can also be used for other, non-bearing-related components in which surface densification is desired.

In one aspect, the invention provides a method of forming a component, the method including heating the component to a burnishing temperature above 500 degrees Fahrenheit, and burnishing a surface of the component while the component is at the burnishing temperature to densify the surface.

In another aspect, the invention provides a method of forming a bearing component from powder metal. The method includes pressing the powder metal, sintering the powder metal at a sintering temperature to form the bearing component, cooling the bearing component from the sintering temperature to a burnishing temperature in the range of 900 to 1300 degrees Fahrenheit, and burnishing a surface of the bearing component while the bearing component is at the burnishing temperature to densify the surface. In some embodiments, the surface is densified to a depth of 1 to 2 mm. In yet further aspects, the bearing component can then be heated to a heat treatment temperature for hardening the bearing component, tempering the bearing component, cooling the bearing component to room temperature, and finishing the bearing component using one of a grinding or a super finishing operation. In further aspects, carburizing can also be included.

In another aspect, the invention provides a method of forming a bearing component from powder metal. The method includes pressing the powder metal, sintering the powder metal at a sintering temperature to form the bearing component, and allowing the bearing component to cool to a temperature below a burnishing temperature. The method also includes re-heating the bearing component to the burnishing temperature in the range of 900 to 1300 degrees Fahrenheit, burnishing a surface of the bearing component while the bearing component is at the burnishing temperature to densify the surface. In some embodiments, the surface is densified to a depth of 1 to 2 mm. In yet further aspects, the method can also include heating the bearing component to a heat treatment temperature for hardening the bearing component, tempering the bearing component, cooling the bearing component to room temperature, and finishing the bearing component using one of a grinding or a super finishing operation. In further aspects, carburizing can also be included.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1A:
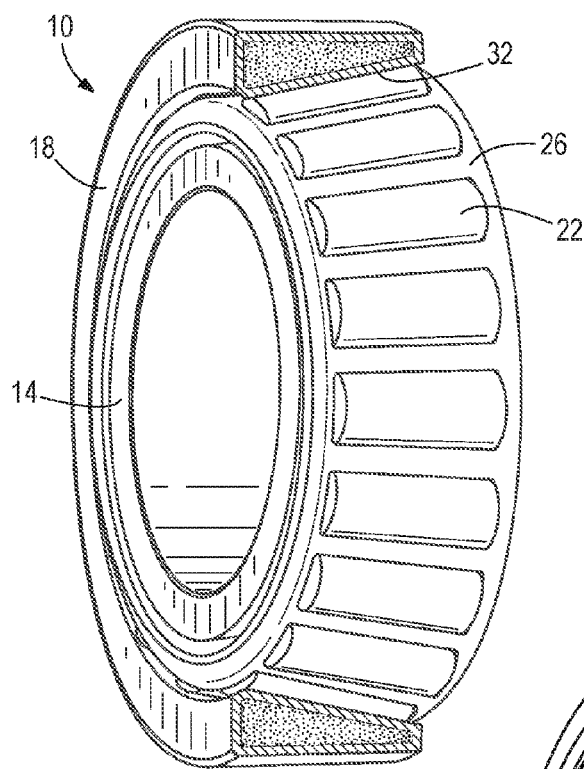
FIG. 1A is a perspective view, partially broken away, of a tapered roller bearing assembly formed using a method in accordance with an aspect of the invention.
Figure 1B:
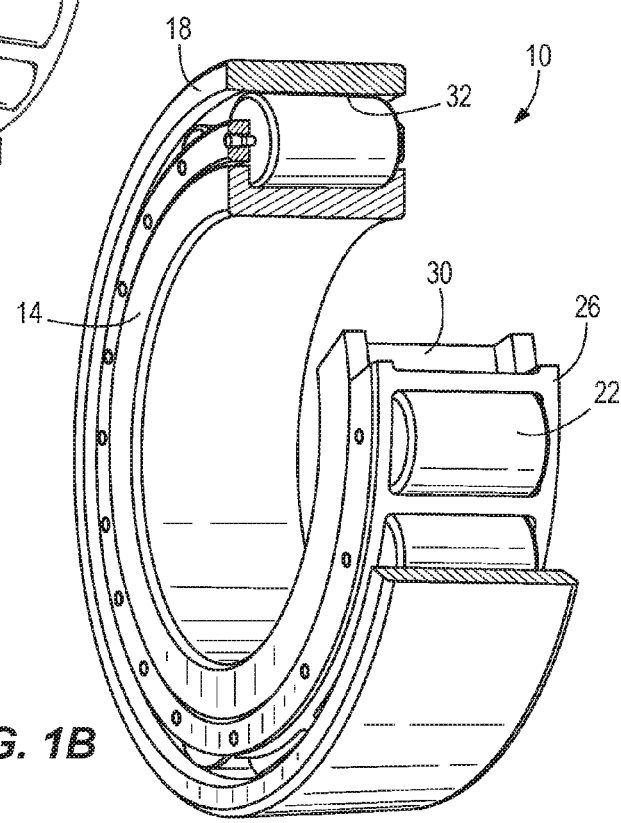
FIG. 1B is a perspective view, partially broken away, of a cylindrical roller bearing assembly formed using a method in accordance with an aspect of the invention.
Figure 1C:
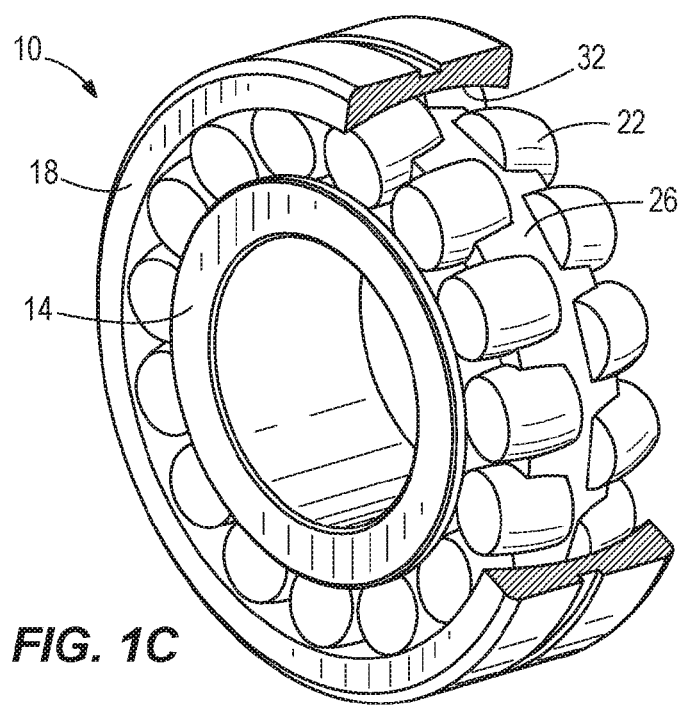
FIG. 1C is a perspective view, partially broken away, of a spherical roller bearing assembly formed using a method in accordance with an aspect of the invention.
Figure 1D:
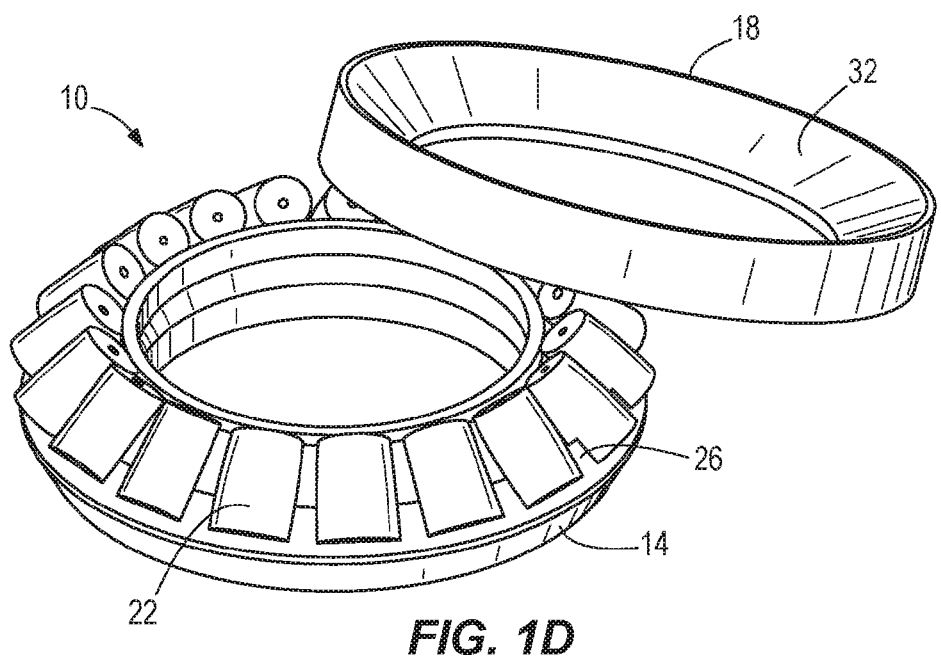
FIG. 1D is a perspective view, partially disassembled, of a tapered spherical roller bearing assembly formed using a method in accordance with an aspect of the invention.
Figure 1E:
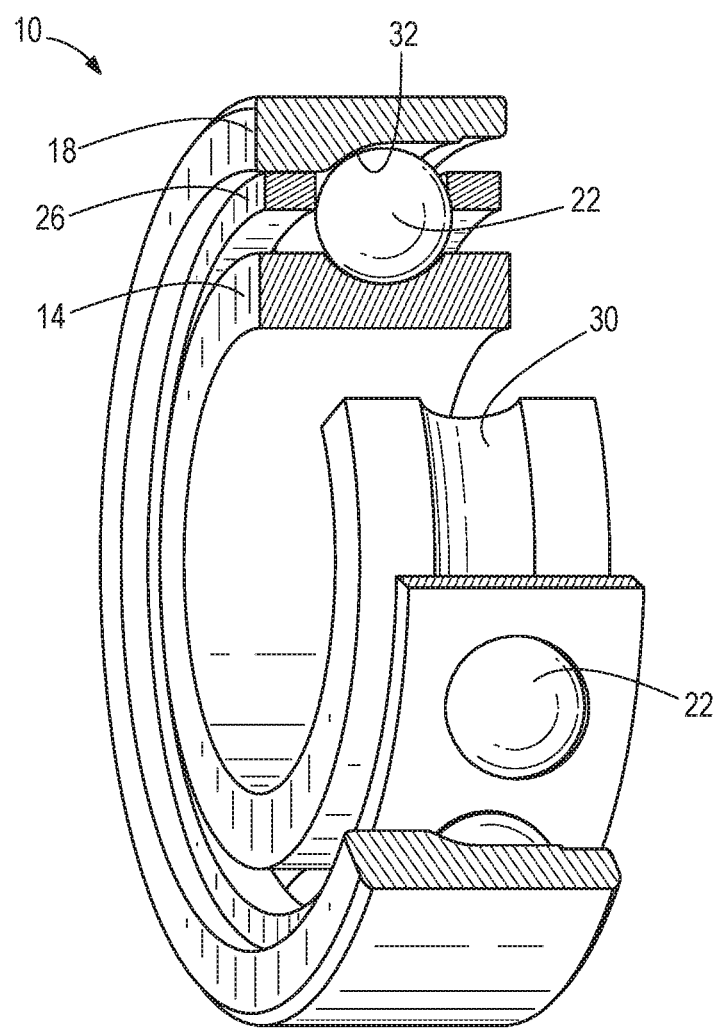
FIG. 1E is a perspective view, partially broken away, of a ball bearing assembly formed using a method in accordance with an aspect of the invention.
Figure 2:
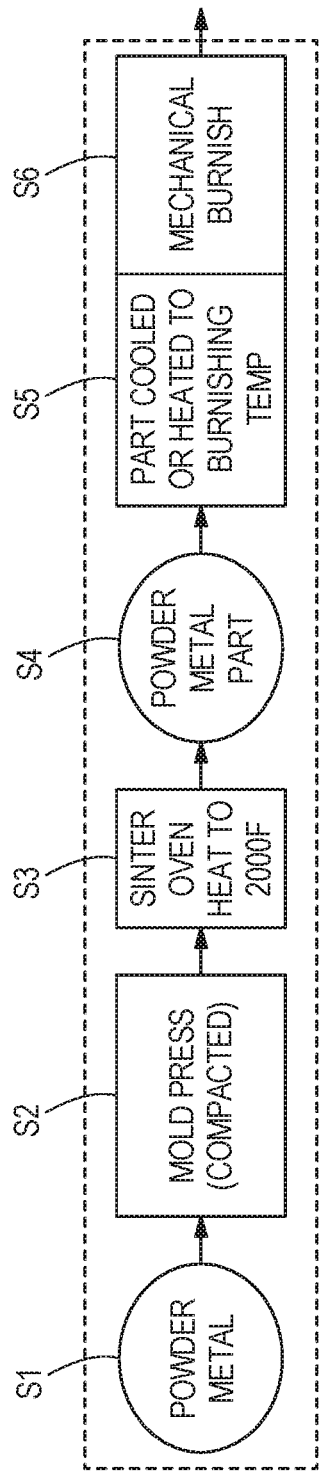
FIG. 2 is a diagram illustrating a portion of an improved bearing manufacturing process.

FIG. 1A illustrates a typical bearing assembly 10 usable to support a shaft in a variety of bearing applications, such that the shaft is operable to rotate and transmit force. The bearing assembly 10 includes an inner race ring 14, an outer race ring 18, and plurality of rolling elements or balls 22 positioned between the inner race ring 14 and the outer race ring 18. The plurality of rolling elements 22 can be distanced from each other or held in a desired orientation by a retainer or cage 26. In other embodiments, no cage need be used to provide a full complement bearing. While the bearing assembly 10 of FIG. 1A is illustrated as a tapered roller bearing, having tapered rollers as rolling elements 22, it is to be understood that different types of bearings with various other rolling elements (e.g., cylindrical roller (FIG. 1B), spherical roller (FIG. 1C), tapered spherical roller (FIG. 1D), ball (FIG. 1E), etc.) may also be used.

The inner race ring 14 defines an inner raceway 30 and the outer race ring 18 defines an outer raceway 32 on which the plurality of rolling elements 22 roll. The bearing assembly 10 may be created using a powder metallurgy process or using a conventional bearing manufacturing processes. The raceways 30, 32 are then densified using an improved surface densification process, as described in detail below, to provide a strengthened bearing surface with greater performance characteristics. The following description is provided in relation to densifying a powder metal ("PM") bearing raceway; however, it is to be understood that the improved surface densification process may also be used on other mechanical components, such as gears, cams, shafts, bushings, etc.

FIGS. 2-5 illustrate the process for forming the PM bearing 10 described above and densifying the raceways 30, 32. The process starts by selecting a powder metal mix (S1) and then compacting the powder metal mix under high pressure into a bearing pre-form (S2). The pre-form is then sintered at a sintering temperature of approximately 1900-2100 degrees Fahrenheit (S3), which causes the powder particles to fuse together to create a powder metal part (S4), such as the inner race ring 14 or the outer race ring 18 of the bearing 10. The PM part is then brought to a burnishing temperature above 500 degrees Fahrenheit (S5). In some embodiments, the burnishing temperature is above 800 degrees Fahrenheit. In other embodiments, the burnishing temperature is in the range of 900-1300 degrees Fahrenheit.

Figure 3:
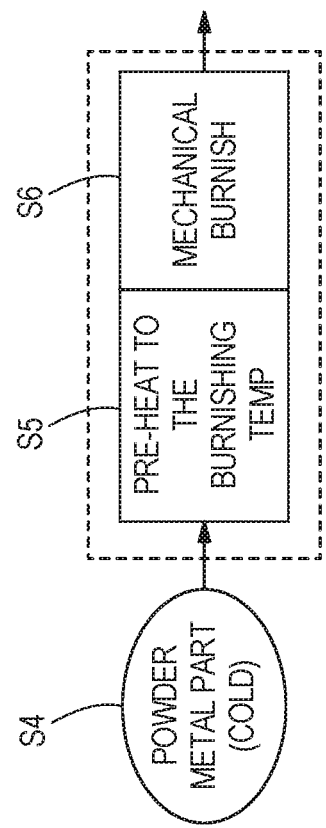
FIG. 3 is a diagram illustrating a portion of an improved bearing manufacturing process.

In one embodiment, the PM bearing component is brought to the burnishing temperature immediately following the sintering process by cooling the component from the sintering temperature to the burnishing temperature. In another embodiment, the bearing component is allowed to fully cool after the sintering process. The component is then re-heated to the burnishing temperature using, for example, induction heating or furnace heating techniques. Thus, a bearing manufacturer may outsource the manufacturing of the un-treated powder metal parts (S1-S4) and then perform the improved method of burnishing at an elevated temperature (S5-S6) at a later time, as shown in FIG. 3. While at the elevated burnishing temperature, the yield strength of, for example, steel is roughly 0.5 to 0.3 times that at room temperature, which makes it easier to plastically deform. Burnishing at temperatures greater than 1300 degrees Fahrenheit has still shown improved densification, however, this increases the complexity of the process and increases the risk of creating oxides in pores of the PM bearing component.

Figures 6, 7:
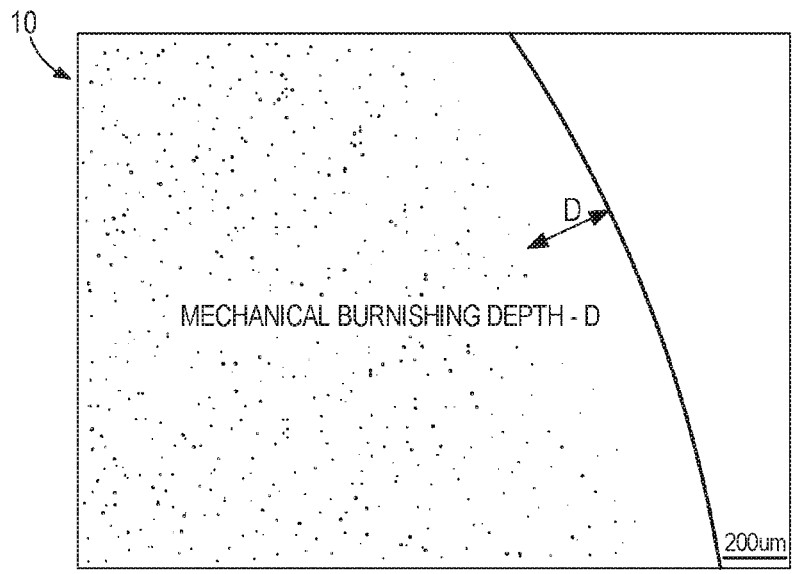
FIG. 6 is a cross-section of a mechanical component, illustrating a burnished depth.
FIG. 7 is a table showing the results of various performance tests.

Once the bearing component is brought to the burnishing temperature, the bearing surface (e.g., one of the raceways 30, 32) is burnished (S6) by a burnishing tool 50, to be described in detail below. By burnishing at an elevated burnishing temperature, the surface of the bearing 10 will be densified to a burnishing depth D of greater than 0.5 mm (FIG. 6). In other embodiments, the burnishing depth D is greater than 1 mm, in a range of 1 to 2 mm, or even greater than 2 mm.

Figure 4:
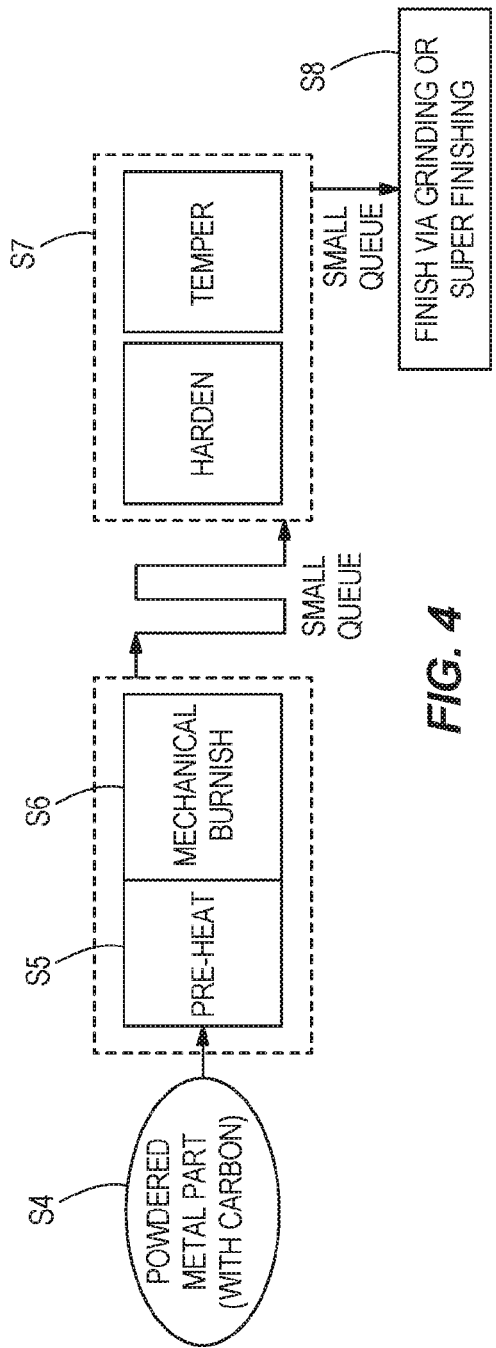
FIG. 4 is a diagram also illustrating an improved bearing manufacturing process.
Figure 5:
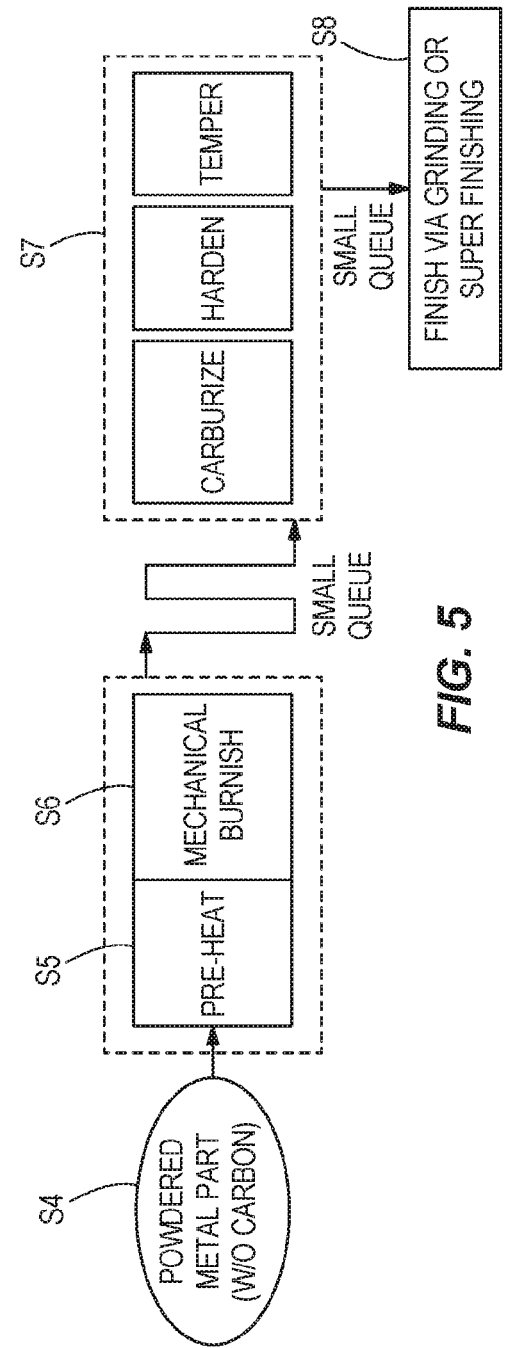
FIG. 5 is a diagram also illustrating an improved bearing manufacturing process.

In reference to FIGS. 4 and 5, the PM bearing component may also be heat treated (S7) using a standard heat treating process after the burnishing step (S6) without cooling the component back to room temperature after the burnishing step. If the PM bearing component includes carbon, the heat treating process (S7) may include a conventional hardening process and a tempering process (FIG. 4). If the PM race rings 14, 18 do not have adequate carbon, the heat treating process (S7) may include carburizing, hardening, and tempering (FIG. 5). After heat treatment, the bearing component may then be cooled and finished (S8) using, for example, a grinding or super finishing operation. Similarly, it is to be understood that the final finishing operation (S8) may also be performed by other suitable mechanical, electrical, optical/laser-assisted, or chemical processes. As an example, the final finishing operation may be chemically assisted by a mechanical tumbling process. The method of forming and heat treating the bearing component, as described above, may be performed as a continuous in-line process, which is more efficient than a batch-style process In reference to FIG. 7, the improved method for densifying a surface drastically increases the performance life of a bearing. In several test cases, standard bearing cups manufactured without the above-described inventive densification process and PM bearing cups that have been densified using the inventive processes described above were subjected to performance testing to determine their operational life. During the tests, the bearing cups were subject to equal rotational speeds under a constant radial load, with fixed lubrication and temperature conditions. The tests show that the PM bearing cups that were densified according to the invention lasted approximately 548 million revolutions on average before failing. This average even includes a single test case wherein the bearing cup failed at 2.2 million revolutions, which was likely the result of a faulty manufacturing process early in the development phase. Further, two of the PM bearing cups ran at least 750 million revolutions. One test was suspended for metallurgical evaluation at 756 million revolutions, while the other ran over a billion revolutions when one of the rolling elements failed due to fatigue. Note that the surface densified bearing ring did not fail in this bearing. On the other hand, the standard bearing cups, which were made of non-PM materials, failed at an average of approximately 154 million revolutions. From these results, it is clear that the PM bearing cups out-performed the standard case carburized cups by a significant margin (i.e., approximately 3.5 times longer). Further, it was found that the dynamic load carrying capacity of the PM cups was at least equivalent to that of the standard case carburized cups. These strong results were certainly unexpected to the inventors, who knew that such results were not achieved using known cold-burnishing techniques (i.e., burnishing techniques performed at room temperature). By using the method described herein, in which burnishing is conducted at an elevated, burnishing temperature, powder metal may now be efficiently utilized to create stronger, longer-lasting, and more reliable bearing components.

Further, the results seem to indicate that performing a similar densification process on a non-PM bearing component would also significantly increase its performance. For example, bearing components made of low-grade steel may be densified using the inventive processes described above to achieve results previously only seen with high-grade bearing steels. Additionally, high-grade bearing steels can be densified to achieve even better results than previously seen without the inventive densification process.

Additionally, the core sections of the PM bearing component unaffected by densification are relatively porous with a modulus of elasticity roughly 60% to 85% of the fully dense wrought material. Thus the raceways 30, 32 are expected to deflect more under application loads. This results in increased stresses along both edges of the raceway profile. To compensate for the lower modulus, the raceway profile can be modified by increasing the crown height 50%-100% when compared to the typical raceway crown heights used with fully dense wrought material.

Figure 8:
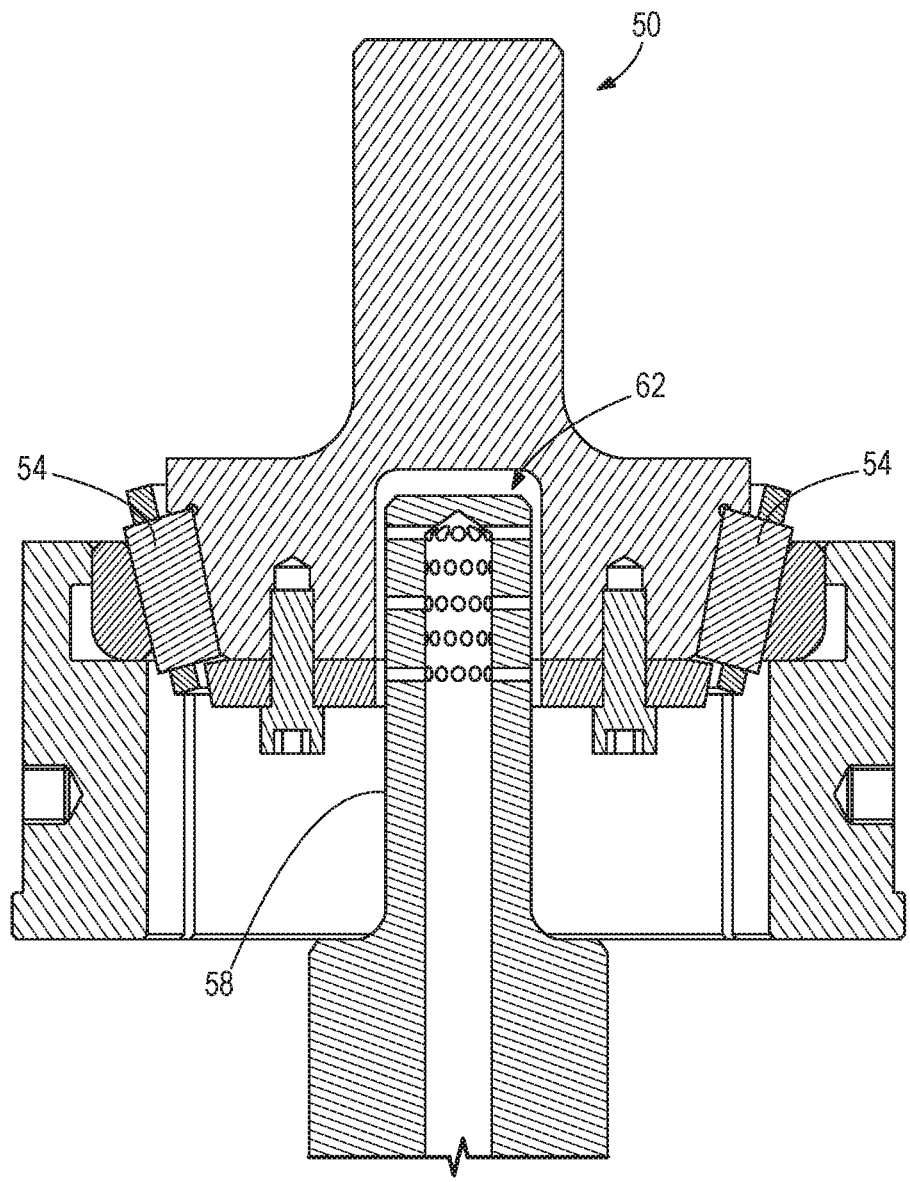
FIGS. 8-16 illustrate various burnishing tools used in the methods diagrammatically shown in FIGS. 2-5.
Figure 9:
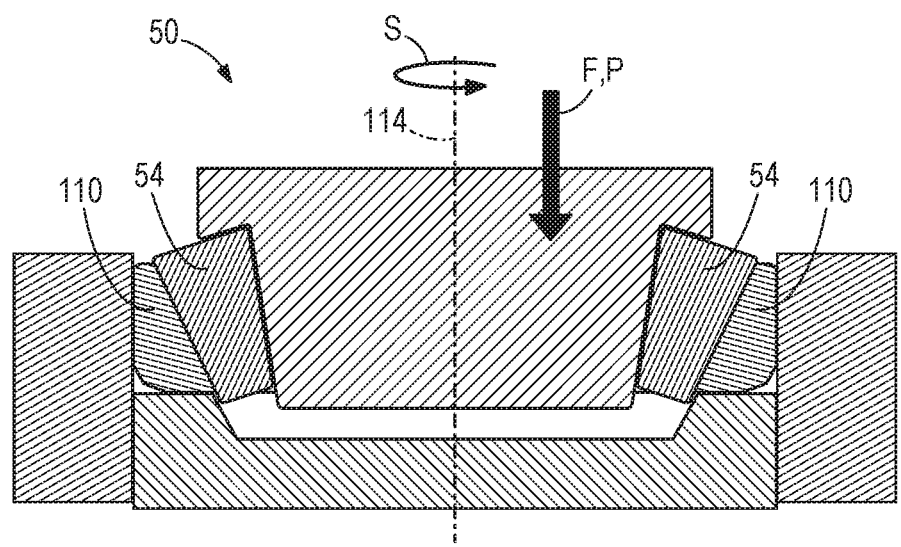
Figure 10:
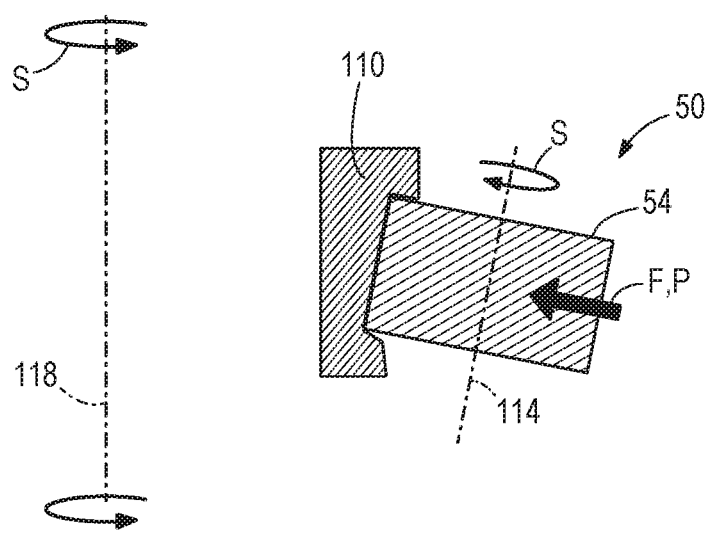
Figure 11:
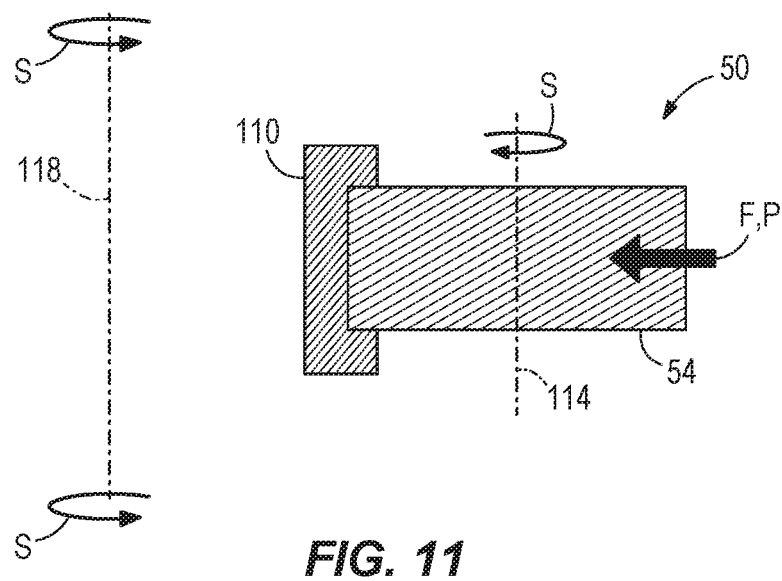
Figure 12:
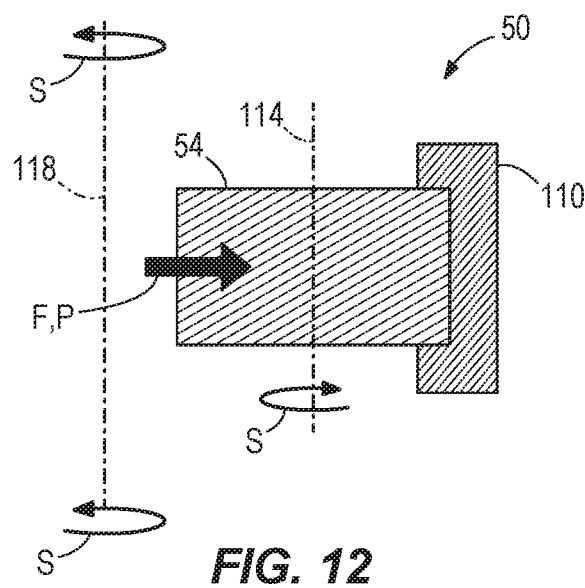
Figure 13:
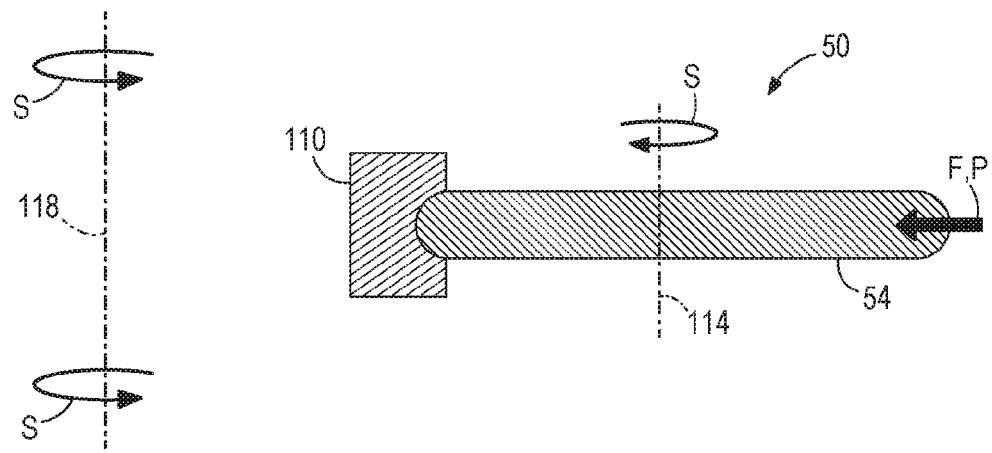
Figure 14:
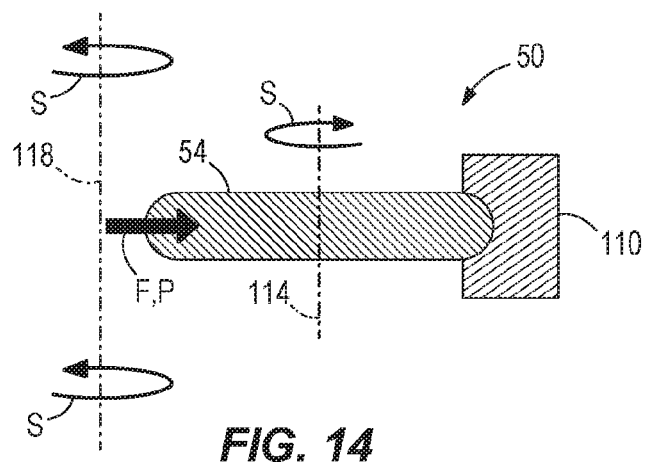
Figure 15:
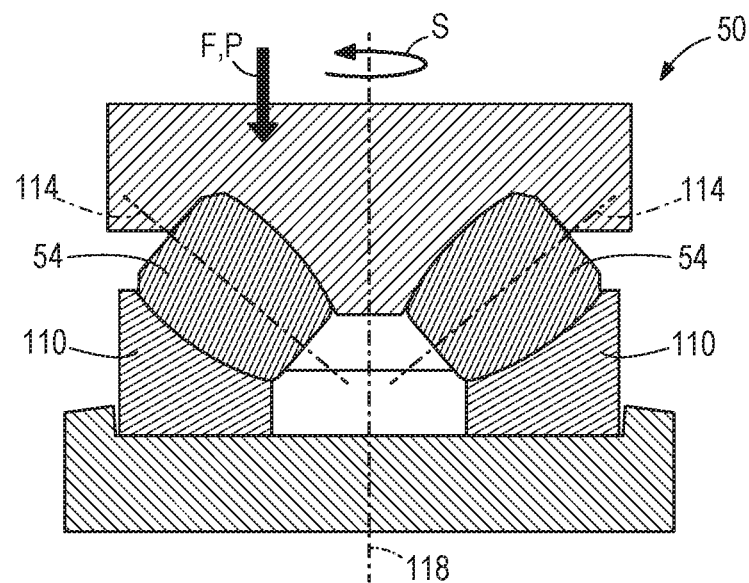
Figure 16:
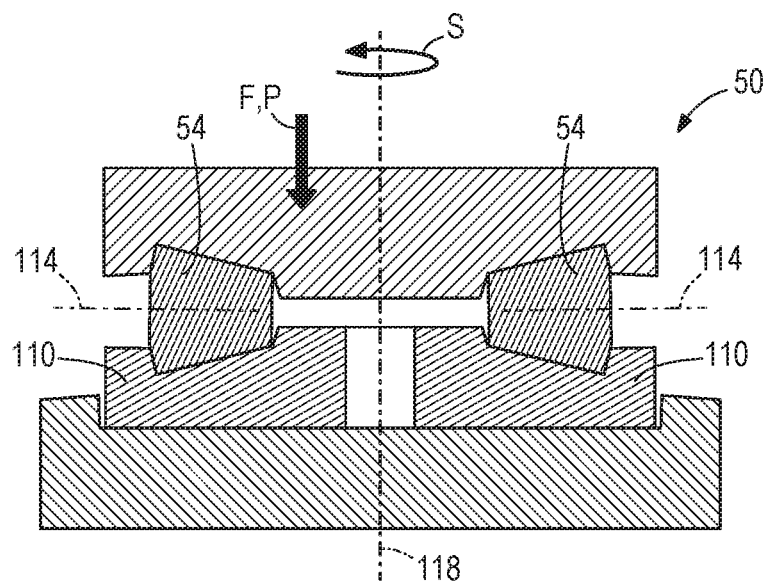

While performing the mechanical burnishing operation at an elevated burnishing temperature, a significant amount of heat is conducted from the warm PM bearing component onto the burnishing tool 50, and especially any burnishing rollers 54 (FIG. 8). Consequently, the burnishing tool 50 may include a cooling mechanism and/or insulation so as to minimize heat conduction to the burnishing tool 50. For example, as shown in FIG. 8, a cooling conduit or quenching spindle 58 may be receivable within a cavity 62 of the burnishing tool 50 for spraying a cool substance (e.g., water, etc.) on the tool 50 for cooling purposes. Further, high-temperature, high-strength steels (e.g., H13, M50) or ceramic (e.g., silicon nitride) can be used to form the burnishing rollers 54. This also helps improve the life of various tooling components.

In operation of the burnishing tool 50, the burnishing rollers 54 are brought into contact with the corresponding bearing component (designated as 110 in FIGS. 9-16). The rollers 54 are rotated about a roller axis 114, while the bearing component 110 is either stationary or rotating in the opposite direction to the tool 50 about a bearing component axis 118. The rotational speed between the tool 50, the rollers 54, and the bearing component 110 is set at a speed S while applying a force F by moving the tool 50 to a position P with respect to the bearing surface as it is at the burnishing temperature T. The parameters (i.e., speed S, force F, position P, and burnishing temperature T) are controlled and/or monitored to provide a desired surface densification D. The complete burnishing cycle can have three embodiments. Cycle 1 includes tool 50 and rollers 54 operating in step 1 clockwise rotation, followed by step 2 counter-clockwise rotation. Cycle 2 includes only clockwise rotation. Cycle 3 includes only counter-clockwise rotation. Complete burnishing cycles are selected depending on material properties desired for a given application.

In various embodiments of the burnishing tool 50 (FIGS. 9-16), the configuration of the tool 50 and/or the rollers 54 are altered such that the tool 50 may be used to densify the raceways of other types of bearings, such as tapered roller bearings (FIGS. 9 and 10), cylindrical roller bearings (FIGS. 11 and 12), ball bearings (FIGS. 13-14), thrust spherical roller bearings (FIG. 15), thrust taper roller bearings (FIG. 16), or the like.

Various features and advantages of the invention are set forth in the following claims.

What is claimed is:

1. A method of forming a bearing component from powder metal, the method comprising:
   pressing the powder metal;
   sintering the powder metal to form the component;
   heating the component to a burnishing temperature in the range of 900 to 1300 degrees Fahrenheit; and
   burnishing a surface of the component while the component is at the burnishing temperature to densify the surface.

2. The method of claim 1, wherein heating the component includes sintering the component at a sintering temperature above the burnishing temperature and cooling the component to the burnishing temperature after sintering the component.

3. The method of claim 1, wherein sintering the component includes cooling the component to a temperature below the burnishing temperature, and wherein heating the component is performed after the component has been cooled following the sintering process.

4. The method of claim 1, wherein burnishing includes using a burnishing tool with a cooling mechanism or insulation or both.

5. The method of claim 1, wherein burnishing includes using a burnishing tool, and further comprising operating the burnishing tool in a first direction and a second direction that is opposite the first direction, and further comprising controlling the speed in each direction.

6. The method of claim 1, wherein burnishing includes using a burnishing tool, and further comprising controlling the force applied by the burnishing tool to the component.

7. The method of claim 1, wherein burnishing includes using a burnishing tool, and further comprising controlling the final position of the burnishing tool relative to the component.

8. The method of claim 1, wherein the bearing component includes one of a ball bearing raceway, a tapered roller bearing raceway, a spherical roller bearing raceway, a tapered spherical roller bearing raceway, or a cylindrical roller bearing raceway.

9. The method of claim 1, further comprising:
   heat treating the component; and
   finishing the component.

10. The method of claim 9, wherein heat treating the component further includes continued heating of the component to a heat treatment temperature greater than the burnishing temperature following burnishing the surface of the component.

11. The method of claim 9, wherein finishing the component includes using a grinding or a super finishing operation or both.

12. The method of claim 1, wherein the surface is densified to a depth greater than or equal to 1 mm.

13. The method of claim 1, wherein the surface is densified to a depth greater than 1 mm and up to 2 mm.

14. The method of claim 1, wherein the surface is densified to a depth in the range of 0.5 mm to 2 mm.

15. A method of forming a bearing component from powder metal, the method comprising:
pressing the powder metal;
sintering the powder metal at a sintering temperature to form the bearing component;
cooling the bearing component from the sintering temperature to a burnishing temperature in the range of 900 to 1300 degrees Fahrenheit; and
burnishing a surface of the bearing component while the bearing component is at the burnishing temperature to densify the surface to a depth of 1 to 2 mm.

16. The method of claim 15, further comprising:
heating the bearing component to a heat treatment temperature after burnishing;
hardening the bearing component;
tempering the bearing component;
cooling the bearing component to room temperature; and
finishing the bearing component using one of a grinding or a super finishing operation.

17. A method of forming a bearing component from powder metal, the method comprising:
pressing the powder metal;
sintering the powder metal at a sintering temperature to form the bearing component;
allowing the bearing component to cool to a temperature below a burnishing temperature;
re-heating the bearing component to the burnishing temperature, the burnishing temperature being in the range of 900 to 1300 degrees Fahrenheit; and
burnishing a surface of the bearing component while the bearing component is at the burnishing temperature to densify the surface to a depth of 1 to 2 mm.

18. The method of claim 17, further comprising:
heating the bearing component to a heat treatment temperature after burnishing;
hardening the bearing component;
tempering the bearing component;
cooling the bearing component to room temperature; and
finishing the bearing component using one of a grinding or a super finishing operation.

* * * * *